US011372599B1

(12) United States Patent
Matsui

(10) Patent No.: US 11,372,599 B1
(45) Date of Patent: Jun. 28, 2022

(54) INFORMATION PROCESSING APPARATUS, NON-TRANSITORY COMPUTER READABLE MEDIUM AND INFORMATION PROCESSING METHOD

(71) Applicant: FUJIFILM Business Innovation Corp., Tokyo (JP)

(72) Inventor: Kenki Matsui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/467,653

(22) Filed: Sep. 7, 2021

(30) Foreign Application Priority Data

Apr. 26, 2021 (JP) .............................. JP2021-074255

(51) Int. Cl.
*G06F 3/12* (2006.01)
*G06F 15/00* (2006.01)
*H04N 1/34* (2006.01)

(52) U.S. Cl.
CPC .......... *G06F 3/1205* (2013.01); *G06F 3/1243* (2013.01); *G06F 3/1258* (2013.01); *G06F 3/1273* (2013.01); *H04N 1/346* (2013.01)

(58) Field of Classification Search
CPC .... G06F 3/1205; G06F 3/1243; G06F 3/1258; G06F 3/1273; H04N 1/346
See application file for complete search history.

(56) References Cited

U.S. PATENT DOCUMENTS

| 2008/0270470 A1* | 10/2008 | Buck ..................... G06F 40/174 |
| 2017/0060487 A1* | 3/2017 | Takeuchi ............. G06F 3/1243 |
| 2017/0070642 A1* | 3/2017 | Miyamoto ........... G06F 3/1288 |

FOREIGN PATENT DOCUMENTS

| JP | 2004-362015 A | 12/2004 |
| JP | 2015-130046 A | 7/2015 |

* cited by examiner

Primary Examiner — Iriana Cruz
(74) Attorney, Agent, or Firm — Oliff PLC

(57) ABSTRACT

An information processing apparatus includes a processor configured to: in accordance with log information on printing performed on a document by a printer, subtract a number of billing units responsive to printing of the document from a number of billing units held by the printer; and if the printer having printed a document as a print target produced by a producer and corresponding to a substitute document prints the substitute document in accordance with the log information and correspondence information indicating a correspondence relation between the document as the print target and the substitute document substituting for the document, not subtract a number of billing units responsive to printing of the substitute document from the number of billing units held by the printer.

19 Claims, 9 Drawing Sheets

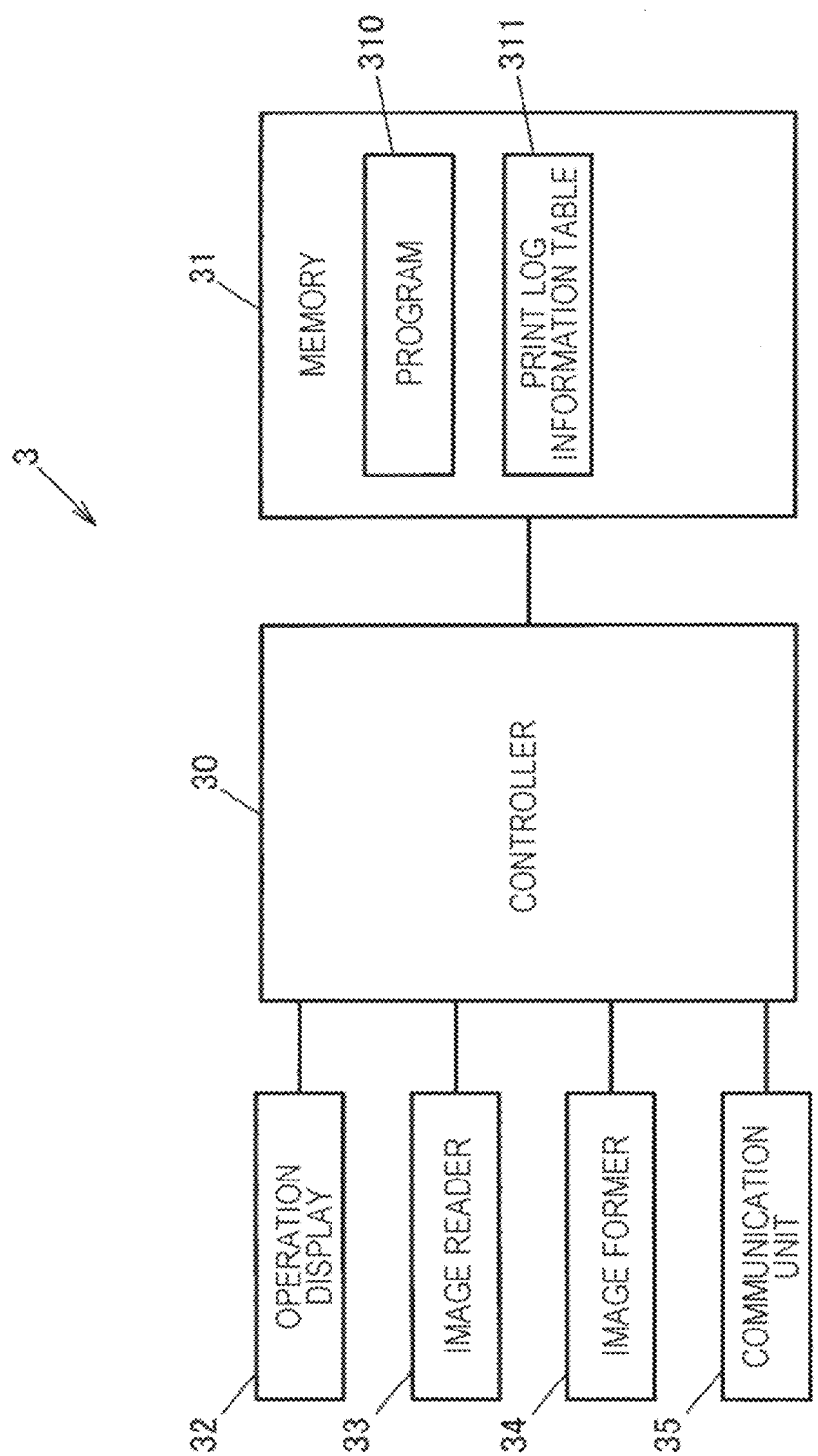

| USER ID | USER ATTRIBUTE | DOCUMENT ID | PRINT JOB ID | PRINT TIME | NUMBER OF COPIES |
|---|---|---|---|---|---|
| User B | STUDENT | D01 | Job1001 | 04/01/2021 12:34 | 10 |
| ... | ... | ... | ... | ... | ... |

| USER ID | USER ATTRIBUTE | DOCUMENT ID | PRINT JOB ID | PRINT TIME | NUMBER OF COPIES |
|---|---|---|---|---|---|
| User B | STUDENT | D01 | Job1001 | 04/01/2021 12:34 | 10 |
| User B | STUDENT | D02 | Job1002 | 04/02/2021 10:55 | 10 |
| ... | ... | ... | ... | ... | ... |

INFORMATION PROCESSING APPARATUS, NON-TRANSITORY COMPUTER READABLE MEDIUM AND INFORMATION PROCESSING METHOD

CROSS-REFERENCE TO RELATED APPLICATIONS

This application is based on and claims priority under 35 USC 119 from Japanese Patent Application No. 2021-074255 filed Apr. 26, 2021.

BACKGROUND

(i) Technical Field

The present disclosure relates to an information processing apparatus, a non-transitory computer readable medium, and an information processing method.

(ii) Related Art

Japanese Unexamined Patent Application Publication No. 2004-362015 discloses a printer apparatus that charges a bill to a print destination in response to a print request in which a print requester is different from the print destination.

A printer apparatus disclosed in Japanese Unexamined Patent Application Publication No. 2004-362015 includes an extraction unit and a bill calculation unit. The extraction unit extracts a destination from a print request when the print request specifying a document to be distributed and the destination is received from a user. When a requester and destination are different, the bill calculation unit charges a bill to the destination extracted by the extraction unit as a billing destination.

SUMMARY

Aspects of non-limiting embodiments of the present disclosure relate to providing an information processing apparatus and non-transitory computer readable medium that, when a print target document produced by a producer is replaced with a substitute document and the substitute document is printed, do not charge a bill to a printer having also printed the print target document before the replacement.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: in accordance with log information on printing performed on a document by a printer, subtract a number of billing units responsive to printing of the document from a number of billing units held by the printer; and if the printer having printed a document as a print target produced by a producer and corresponding to a substitute document prints the substitute document in accordance with the log information and correspondence information indicating a correspondence relation between the document as the print target and the substitute document substituting for the document, not subtract a number of billing units responsive to printing of the substitute document from the number of billing units held by the printer.

BRIEF DESCRIPTION OF THE DRAWINGS

Exemplary embodiments of the present disclosure will be described in detail based on the following figures, wherein:

FIG. 5 illustrates a configuration example of an image processing apparatus;

FIGS. 6A and 6B illustrate an example of a print log information table stored on the image processing apparatus;

DETAILED DESCRIPTION

Figure 1:
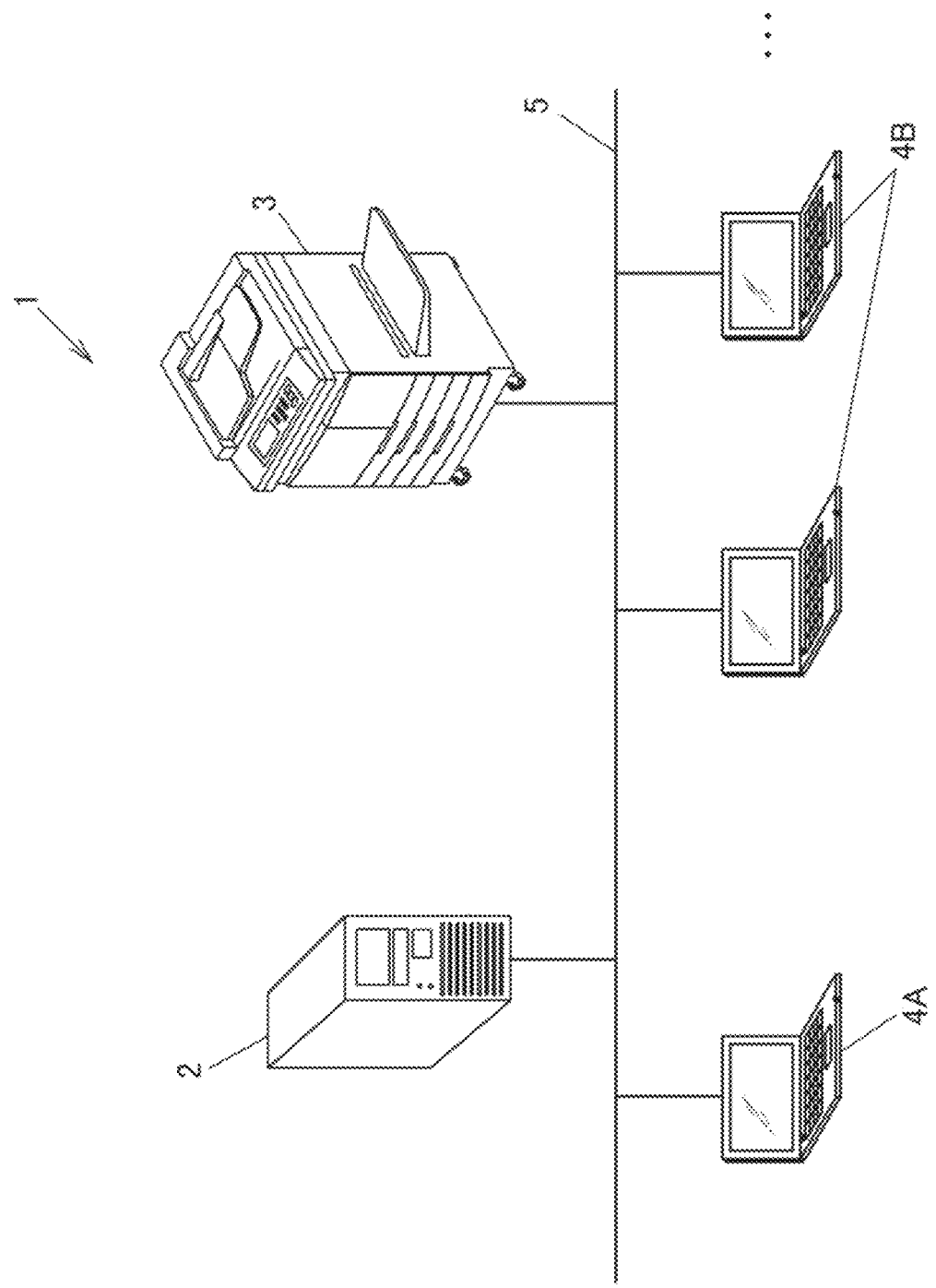
FIG. 1 illustrates a configuration example of an information processing system of an exemplary embodiment of the disclosure.

Exemplary embodiment of the disclosure is described with reference to the drawings. Referring to the drawings, like elements are designated with like reference numerals and the discussion thereof is not duplicated.

Summary of Exemplary Embodiment

An information processing apparatus of the exemplary embodiment includes a processor. In accordance with log information on printing performed on a document by a printer, the processor subtracts a number of billing units responsive to printing of the document from a number of billing units held by the printer. When the printer having printed a document as a print target produced by a producer and corresponding to a substitute document prints the substitute document in accordance with the log information and correspondence information indicating a correspondence relation between the document as the print target and the substitute information substituting for the document, the processor does not subtract the number of billing units responsive to printing of the substitute document from the number of billing units held by the printer.

The number of billing units refers to an amount of money billed in accordance with the number of copies, print form, and/or print time. A predetermined point is set up in accordance with operations responsive to the number of copies, print form, print time, user who has printed, printer apparatus having printed, and print target document. The billing unit is a unit of point. A billing process may be performed by converting one point into a predetermined amount of money. Alternatively, a specific number of points is kept on a per user basis and each time an operation is performed, the points responsive to the performed operation are reduced from the number of points. No service may be available when all the points are used. The print forms include monochrome printing that prints a monochrome image on a paper sheet, color printing that prints a color image on a paper sheet, simplex printing that prints on a single side of a paper sheet, duplex printing that prints on double-sides of a paper sheet, and N-up printing that prints images of N pages on a single side of a paper sheet.

EXEMPLARY EMBODIMENT

FIG. 1 illustrates a configuration example of an information processing system 1 of an exemplary embodiment of the disclosure.

The information processing system 1 includes a server 2, image processing apparatus 3, and user terminals 4A and 4B. The server 2 manages a document. The image processing apparatus 3 prints a document or the like. The user terminal 4A is used by a teacher. The user terminals 4B are used by students. The server 2, image processing apparatus 3, and user terminals 4A and 4B are interconnected to each other. Referring to FIG. 1, the single image processing apparatus 3 is employed. Alternatively, multiple image processing apparatuses 3 may be employed. The server 2 is an example of an information processing apparatus. The teacher is an example of a producer of a document. The student is an example of a printer of the document. The teacher and students may be collectively referred to as users.

The server 2 receives a registration of a document serving as a print target before substitution (also referred to as an original document) and a substitute document (substituted for the original document) and performs a billing process on the printing of the documents.

The billing process substrates a print point number responsive to printing of a document from a print point number held by a user. According to the exemplary embodiment, for convenience of explanation, the printing is monochrome simplex printing and one print point is consumed on a per print page. Concerning the print point number responsive to the printing, the N-up print may have the same print point number as the simplex printing. The color printing may have twice the point as the monochrome pointing. The duplex printing may have twice the print point number as the simplex printing.

The image processing apparatus 3 is a multi-function apparatus having multiple functions including a print function, scan function, copy function, email function, and/or fax function.

When a print job is transmitted from the user terminals 4A and 4B, the image processing apparatus 3 acquires a document from the server 2 in response to the print job and prints the document. Upon completing printing, the image processing apparatus 3 stores a print log in a print log information table 311 described below and transmits print log information to the server 2.

The user terminals 4A and 4B are information processing terminals, such as personal computers (PCs). The user terminals 4A and 4B may be mobile information processing terminals, such as laptops or tablet terminals, or mobile communication terminals, such as multi-function mobile phones (smart phones).

The user terminals 4A and 4B transmit a print job to the image processing apparatus 3 to cause the image processing apparatus 3 to print a document. The print job includes user identification (ID) identifying a user operating the user terminals 4A and 4B, namely providing a print instruction, document ID identifying a document serving as a print target, number of copies, and print form.

A network 5 may include, for example, a local-area network (LAN), wide-area network (WAN), intranet, and/or the Internet. The network 5 may be wired and/or wireless.

Configuration of Server

Figure 2:
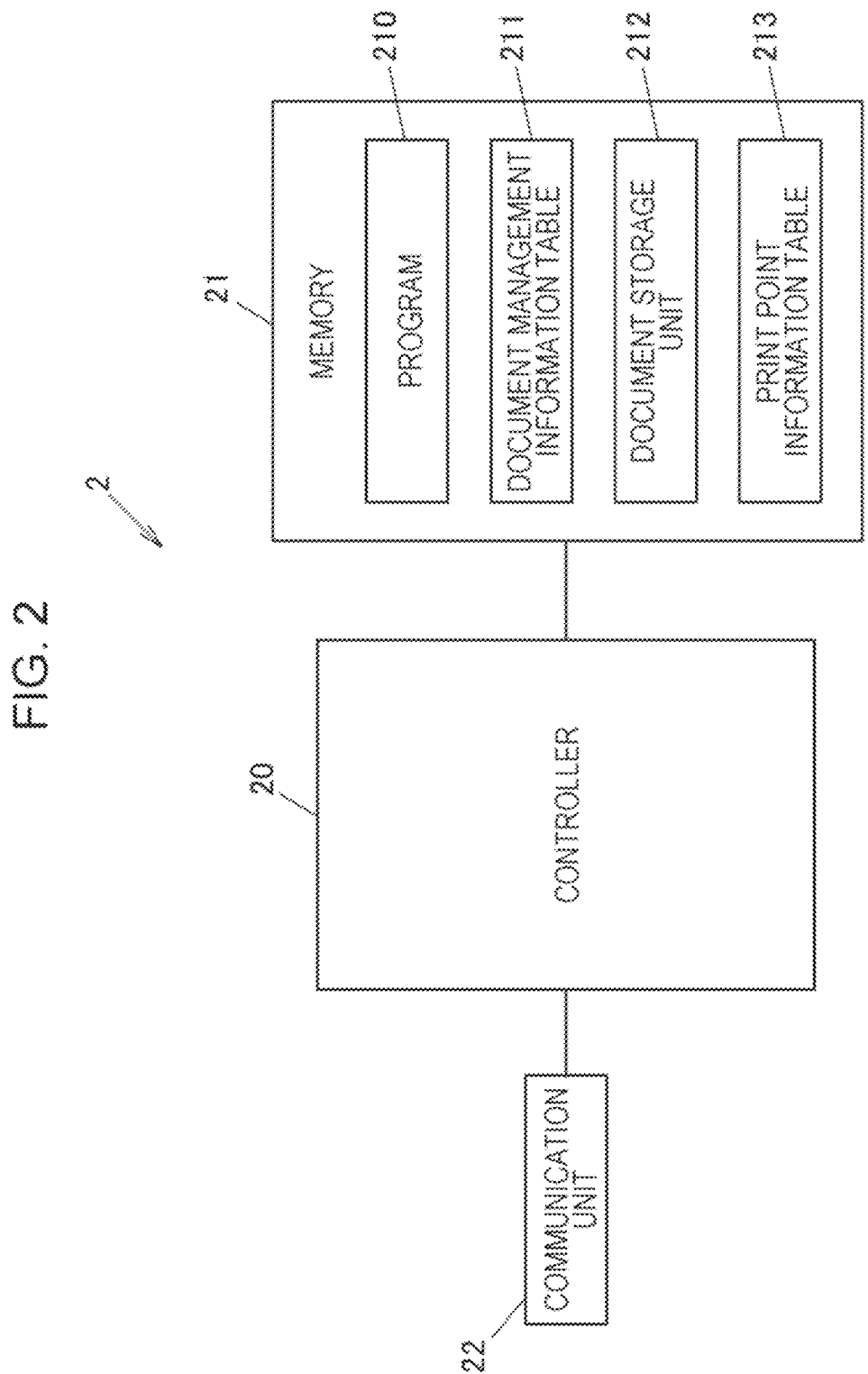
FIG. 2 is a block diagram illustrating a configuration example of a server.

FIG. 2 is a block diagram illustrating a configuration example of the server 2. The server 2 includes a controller 20, memory 21, and communication unit 22 connected to the network 5.

The controller 20 includes a processor, such as a central processing unit (CPU), and an interface. By executing a program 210 stored on the memory 21, the processor in the controller 20 manages documents and performs the billing process.

The memory 21 include a read-only memory (ROM), random-access memory (RAM), and hard disk. The memory 21 stores a variety of information including the program 210, document management information table 211 (FIG. 3), document storage unit 212, print point information table 213 (FIG. 4), and user information. The user information includes a user ID identifying a user and attributes of a teacher, students, and assistants.

The communication unit 22 communicates with the image processing apparatus 3 and user terminals 4A and 4B via the network 5.

Figure 3A:
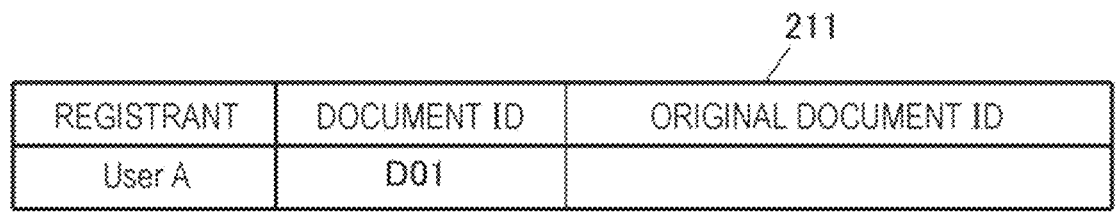
FIGS. 3A and 3B illustrate an example of a document management information table stored on the server.
Figure 3B:
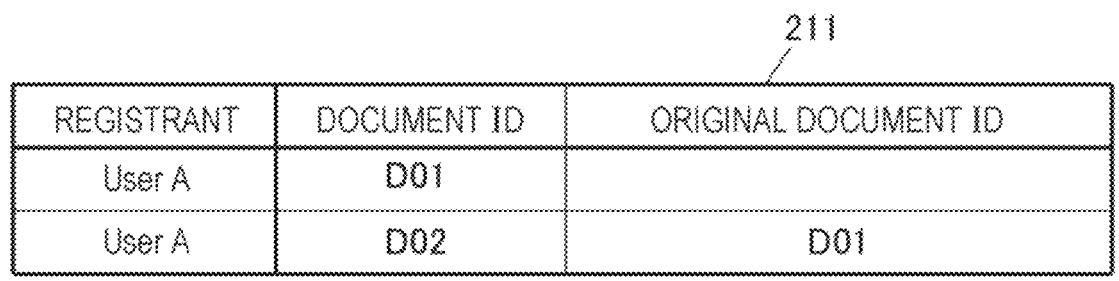

FIGS. 3A and 3B illustrate an example of the document management information table 211 stored on the server 2. The document management information table 211 includes fields for "registrant," "document identification (ID)," and "original document ID (before substitution)." Document management information including these fields is stored on the controller 20 in the server 2. The document management information is an example of correspondence information that indicates a relationship between a document serving as a print target and a document substituting for the document.

The registrant field stores a user ID (such as a user A) of a person (for example, a teacher) who has registered the document on the server 2. The document ID field stores a document ID identifying the document. The original document ID field stores an original document ID when the document is replaced with a substitute document.

FIG. 4 illustrates an example of the print point information table 213 stored on the server 2. The print point information table 213 includes fields for "user ID," "user attribute," and "print point." Print point information including these fields is stored on the controller 20.

The user ID field stores a user ID identifying a user. In accordance with the user information stored on the memory 21, the user attribute field stores the attribute of a user indicating whether the user is a teacher or a student. The print point field stores a print point number held by the user. The print point is an example of a billing unit. The print point number is an example of the number of billing units.

The controller 20 in the server 2 is described below.

In accordance with the print log information, the controller 20 subtracts a print point number responsive to printing of a document from a print point number held by a printer. When the student having printed the document as the print target responsive to the substitute document prints the substitute document in accordance with the print log information and document management information, the controller 20 does not subtract the print point number responsive to the printing of the substitute document from a print point number held by the student.

If the student having printed the substitute document has printed the document as the print target, the controller 20 may subtract a print point number responsive to the printing of the substitute document from a print point number held by an instructor (such as an assistant) who has provided an instruction to substitute for the document. If the instruction to substitute for the document provided by the instructor is based on an instruction from the teacher, the controller 20 may subtract the print point number responsive to the printing of the substitute document from a print point number held by the teacher.

Configuration of Image Processing Apparatus

FIG. 5 is a block diagram illustrating a configuration example of the image processing apparatus 3. The image processing apparatus 3 includes a controller 30 that controls elements of the image processing apparatus 3. The controller 30 is connected to a memory 31, operation display 32, image reader 33, image former 34, and communication unit 35.

The controller 30 includes a processor, such as a CPU, interface, and the like. The processor in the controller 30 prints a document and manages print log information by executing a program 310 stored on the memory 31. Specifically, when a print job is transmitted from the user terminals 4A and 4B, the controller 30 transmits to the server 2 information concerning the print job, acquires from the server 2 a document corresponding to a document ID included in the information concerning the print job, and prints the document on a paper sheet. Upon completing the printing, the controller 30 stores a print log in the print log information table 311 and transmits print log information to the server 2.

The memory 31 includes a ROM, RAM, hard disk, and the like and stores a variety of information such as the program 310 and print log information table 311 (FIG. 6).

The operation display 32 is used to receive and/or display information. The operation display 32 is a touch panel display and includes a touch panel overlaid on a display, such as a liquid-crystal display.

The image reader 33 includes an automatic document feeder mounted on a document platen, and a scanner that optically reads the image of a document placed on the document platen or transported from the automatic document feeder.

The image former 34 produces and outputs printed matter by forming an image via the electrophotographic system or ink jet system.

The communication unit 35 includes a network interface card (NIC), modem and the like, communicates with the server 2, and the user terminals 4A and 4B via the NIC and the network 5, modulates or demodulates a signal for fax via the modem, and fax communicates with an external communication apparatus via the network 5.

FIG. 6 illustrates an example of the print log information table 311 stored on the image processing apparatus 3. The print log information table 311 includes fields for a "user ID," "user attribute," "document ID," "print job ID," "print time ID," and "number of copies." The print log information in each field is stored by the controller 30. The fields of the print log information are not limited to those described herein. For example, the print log information table 311 may further include a field for billing, for example, the print form, such as monochrome printing or color printing. The print form including the number of copies, monochrome printing, color printing may be used to calculate points in printing.

The user ID identifies a user. The user attribute specifies based on user information stored on the server 2 whether the user is a teacher or a student. The document ID identifies each document. The print job ID specifies identification information assigned to each print job. The print time specifies time when the printing is performed. The number of copies specifies the number of copies of the document.

Process of Information Processing System

Process of the information processing system 1 is described below.

(1) Registration of Document

Figure 8:
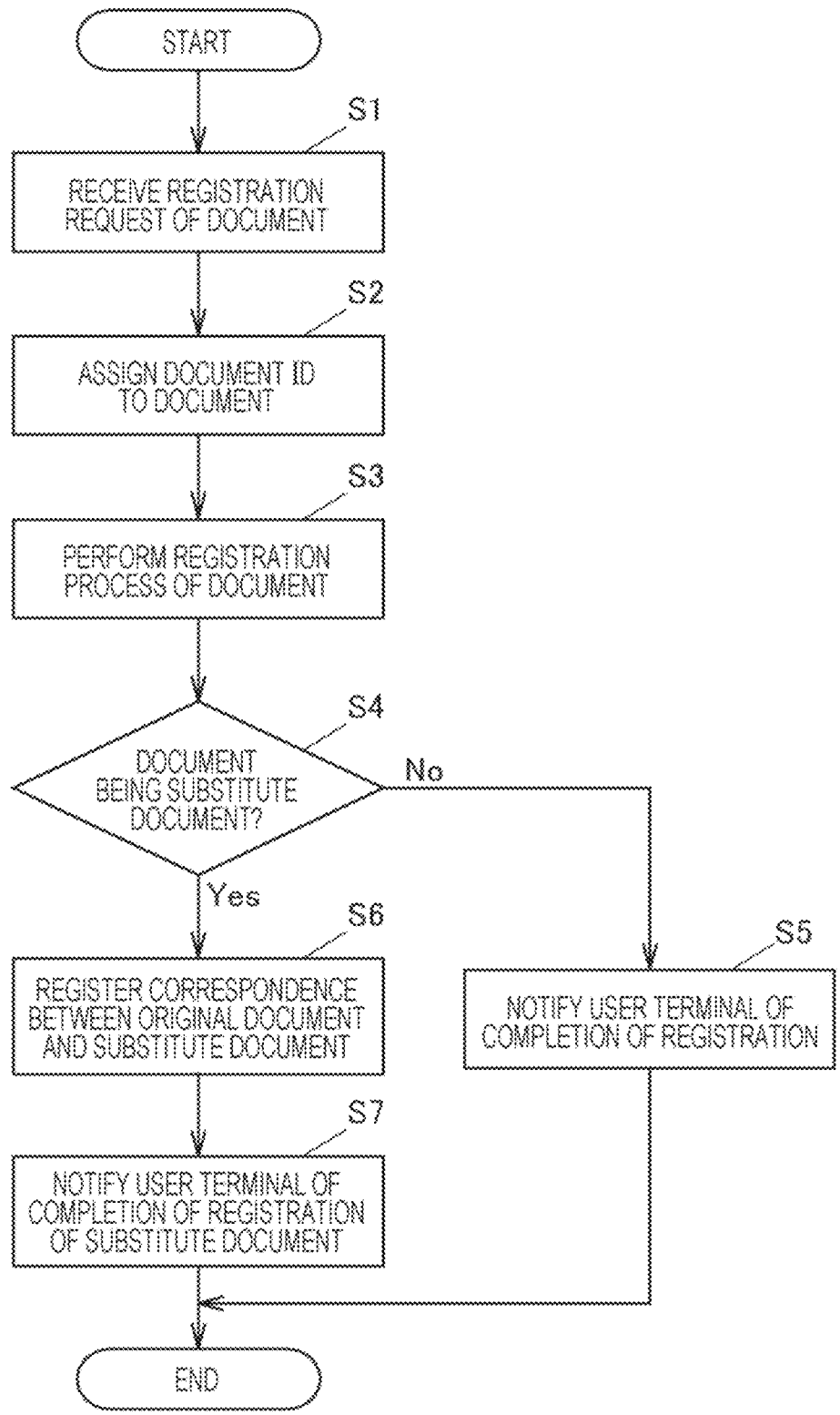
FIG. 8 is a flowchart illustrating a process example of the server in the registration of a document.

Registration of a document is described with reference to FIGS. 3A, 3B, and 8. FIG. 8 is a flowchart illustrating a process example of the server 2 in the registration of a document. In the following discussion, the process is performed by the controller 20 in the server 2 unless otherwise particularly noted.

In order to deliver to a student a document serving as a task, a teacher accesses the server 2 via the user terminal 4A and requests the server 2 to register the document. The controller 20 in the server 2 receives a registration request of the document from the user terminal 4A (step S1). The registration request of the document includes a user ID of the teacher, document, type of the document (indicating whether the document is a substitute document), and the like. If the type of document is a substitute document, the registration request further includes information indicating an original document (e.g., a document ID of the document before the substitution). The teacher may substitute another task and in such a case, the type of document may be a substitute document. The objective of the delivery of the document is not limited to the objective described above. The replacement of the task may be performed to correct a mistake in the task given by the teacher, revise a manual, or comply with a change in a law.

The controller 20 in the controller 20 assigns a document ID to a document included in the document registration request (step S2).

The controller 20 performs a document registration process (step S3). Referring to FIG. 3A, the controller 20 stores, in the document management information table 211, a user ID (e.g., user A) in the registrant field and document ID (e.g., D01) in the document ID field, and stores the document in association with the document ID on the document storage unit 212. The document is thus registered.

The controller 20 determines in accordance with the type of the document whether the document included in the registration request received in step S1 is a substitute document (step S4).

If the type of the document is not a substitute document (no path in step S4), the controller 20 notifies the user terminal 4A used by the teacher and the user terminal 4B used by the student of the completion of the registration of the document (hereinafter also referred to as a notification of registration completion of the document) (step S5). The notification may also include the document ID, file name, date of registration, and the like. The teacher may transmit the notification to the student from the user terminal 4A to the user terminal 4B.

If the type of the document is a substitute document in step S4 (yes path), the controller 20 registers a correspondence relation between the original document and the substitute document (step S6). Specifically, referring to FIG. 3B, the controller 20 stores, in the document management information table 211, the user ID (e.g., user A) in the registrant field, document ID (e.g., D02) in the document ID field, original document ID in the document original ID field, and stores the document in association with the document ID on the document storage unit 212. The correspondence relation between the original document and the substitute document is thus registered.

The controller 20 notifies the user terminal 4A used by the teacher and the user terminal 4B used by the student that the document is replaced (hereinafter referred to as a notification of registration completion of the substitute document) (step S7). The notification may include the original document ID, document ID after the substitution, file name, date of registration, and the like. The teacher may transmit the notification to the student from the user terminal 4A to the user terminal 4B.

(2) Printing of Document

Printing of the document is described with reference to FIGS. 6A and 6B. In the following discussion, the process is performed by the controller 30 in the image processing apparatus 3 unless otherwise particularly noted.

When the controller 30 in the image processing apparatus 3 receives from the user terminals 4A and 4B an instruction for a document ID registered on the server 2 and a print job with the print form of the corresponding job set up, the controller 30 in the image processing apparatus 3 transmits to the server 2 an acquisition request of the job responsive to the document ID included in the print job. The controller 30 acquires from the server 2 the document responsive to the document ID included in information concerning the print job and prints the document in accordance with the print form set in the print job by controlling the image former 34. When the printing is complete, the controller 30 stores print log information on the printing in the print log information table 311.

A student having user B as a user ID may now print 10 copies of a document having D01 as a document ID. When the document having D01 as the document ID has been printed, the controller 30 stores, in the print log information table 311 as illustrated in FIG. 6A, user B in the user ID field, student in the user attribute field, D01 in the document ID field, number of copies (e.g., 10 copies) in the number of copies field, job1001 in the print job ID field that the image processing apparatus 3 has assigned to the print job, and 04/01/2021 12:34 serving as date information in the print time field indicating completion time of the printing of the print job. The controller 30 transmits to the server 2 the print log information with the document ID D01 stored in the print log information table 311.

The student having user B as a user ID may now print 10 copies of a document having D02 as a document ID. When the document having D02 as the document ID has been printed, the controller 30 stores, in the print log information table 311 as illustrated in FIG. 6B, user B in the user ID field, student in the user attribute field, D02 in the document ID field, number of copies (e.g., 10 copies) in the number of copies field, job1002 in the print job ID field that the image processing apparatus 3 has assigned to the print job, and 04/02/2021 10:55 serving as date information in the print time field indicating completion time of the printing of the print job. The controller 30 transmits to the server 2 the print log information with the document ID D02 stored in the print log information table 311.

(3) Billing Process for Printing of Document

Figure 9:
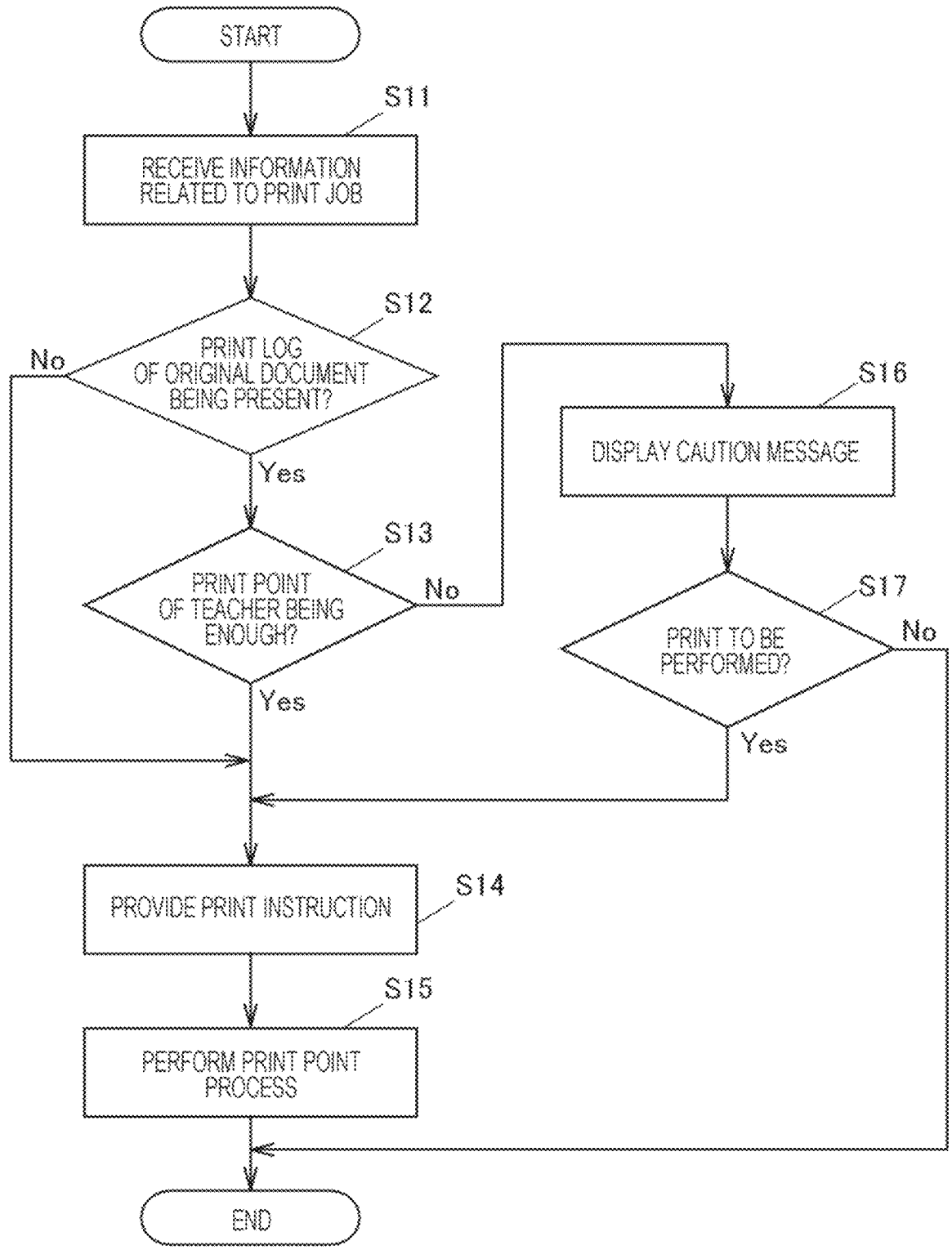
FIG. 9 is a flowchart illustrating a process example of the server in a billing process.

Billing process for the printing of the document is described with reference to FIGS. 4A through 4C, 7, and 9. FIG. 9 is a flowchart illustrating a process example of the server 2 in the billing process. In the following discussion, the process is performed by the controller 20 in the server 2 unless otherwise particular noted.

Upon receiving a print job from the user terminals 4A and 4B, the controller 30 in the image processing apparatus 3 transmits information concerning the print job to the server 2. The controller 20 in the server 2 receives the information concerning the print job from the controller 30 in the image processing apparatus 3 (step S11). The information concerning the print job includes a document ID and a user ID of a user who has provided a print instruction.

The controller 20 determines whether there is a print log of the original document having the user ID of the user who has provided the print instruction (step S12). Specifically, the controller 20 determines whether the document ID included in the information concerning the print job is registered in the document ID field and the original document ID corresponding to the document ID is registered in the original document ID field in the document management information table 211. If the original document ID is not registered, there no print log of the original document (no path in step S12). The controller 20 retrieves from the document storage unit 212 the document corresponding to the document ID included in the information concerning the print job, transmits the document to the image processing apparatus 3, and provides a print instruction (step S14).

Figure 4A:
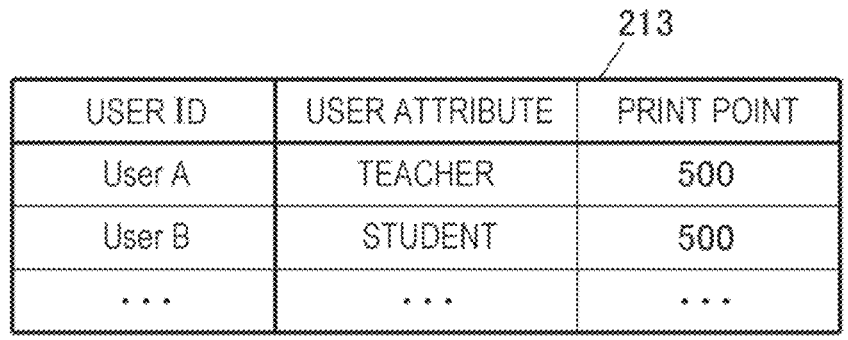
FIGS. 4A through 4C illustrate an example of a print point information table stored on the server.
Figure 4B:
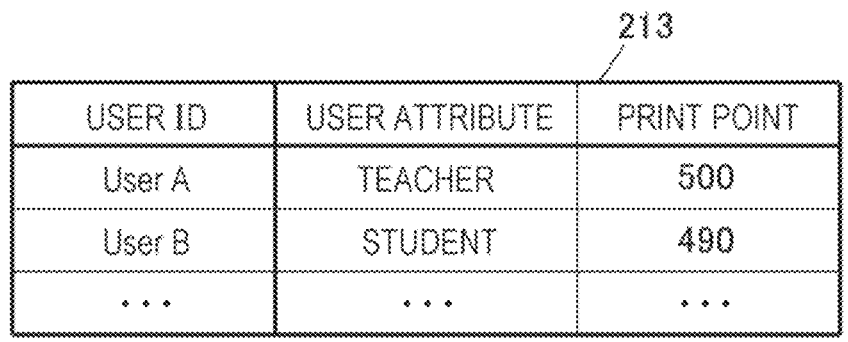

The controller 20 performs a print point process (step S15). Specifically, based on the print log information responsive to the print log information table 311 transmitted from the image processing apparatus 3 and illustrated in FIG. 6A, the controller 20 recognizes that the document having D01 as a document ID of the user B as the user ID as has been printed. Referring to FIG. 4A, the controller 20 subtracts a print point number of 10 from a print point number of 500 held by user B before reduction and results in a print point number of 490 as illustrated in FIG. 4B.

If the document ID included in the information concerning the print job is registered in the document ID field in the document management information table 211, the original document ID is registered in the original document ID field in response to the document ID, and the print log of the original is present in accordance with the print log information retrieved from the image processing apparatus 3 (yes path in step S12), the controller 20 determines whether the print point number of the teacher is enough (step S13). Specifically, let Pa represent the print point number of the teacher and Pb the print point number responsive to the printing of the substitute document and if Pa≥Pb, the controller 20 determines that the print point number of the teacher is enough. If Pa<Pb, the controller 20 determines that the print point number of the teacher is not enough.

The document ID may now be D02, and D01 of the substitute document ID may be registered. The controller 20 determines that the print log is present for the original document as illustrated in FIG. 6B (yes path in step S12), the teacher has a print point number of 500, and a print point number to be consumed is 10. The controller 20 thus determines that the print point number of the teacher is enough (yes path in step S13).

Figure 4C:
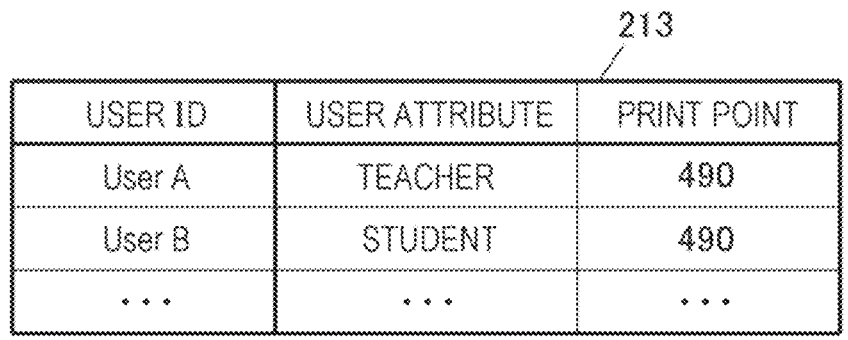

If the print point number of the teacher is enough, the controller 20 provides a print instruction (step S14) and performs a print point process (step S15). Referring to FIG. 4B, the controller 20 subtracts a print point number of 10 from a print point number of 500 held by the teacher as user A before reduction and results in a print point number of 490 as illustrated in FIG. 4C.

If the controller 20 determines that the print point number of the teacher is not enough (no path in step S13), the controller 20 controls the user terminal 4B such that a caution message is displayed (step S16).

Figure 7:
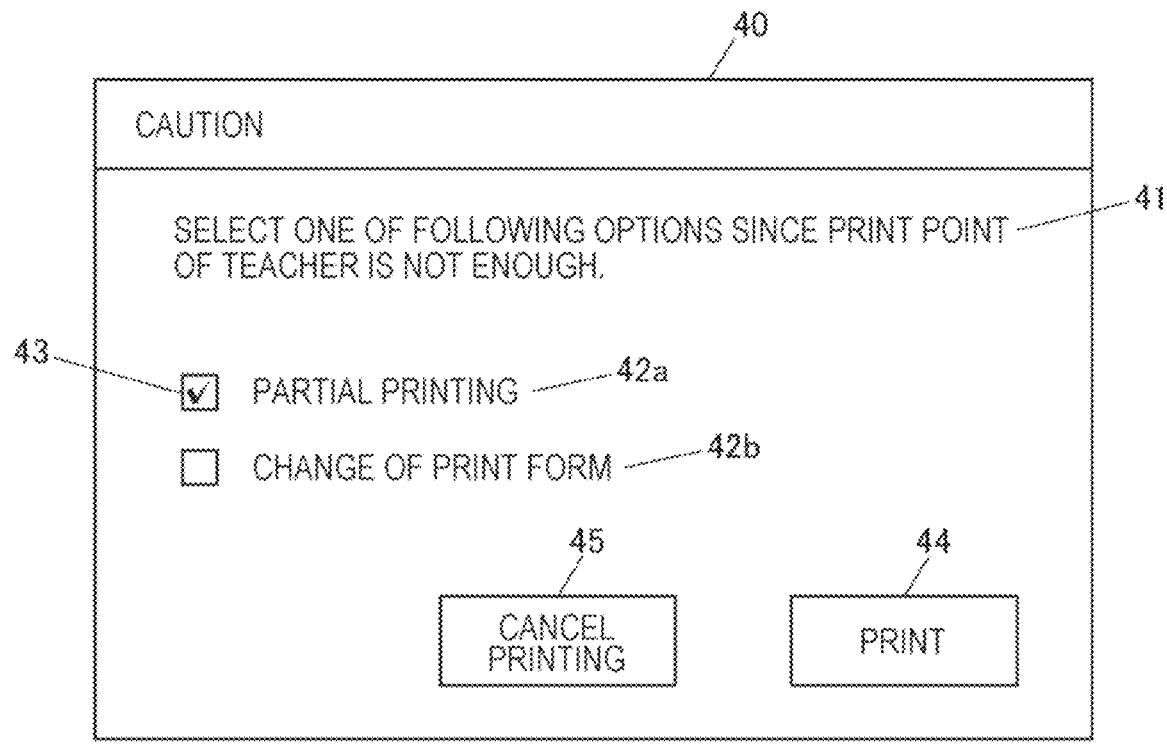
FIG. 7 illustrates a caution screen displayed on a user terminal.

FIG. 7 is an example of a caution screen 40 displayed on the user terminal 4B. The caution screen 40 includes a message 41 reading "Select one of the following options since print point is not enough," check boxes 43 for selecting options 42a and 42b for "partial printing," and "change of print form," "print" button 44 that enters the selection of one of the options 42a and 42b and provides a print instruction, and "cancel printing" button 45 used to cancel printing.

If the option 42a for the partial printing is selected and the print button 44 is operated (step S17), the controller 20 in the server 2 determines a difference between the document as a print target and the substitute document, transmits information on the difference to the image processing apparatus 3, and provides a print instruction (step S14).

The difference and a region before the difference or a region after the difference may be determined and printed. The region before the difference or the region after the difference may be an area where the region before the difference or the region after the difference is related to the difference. The related area may be the same page as the difference or if the difference is a question, the related area may be an answer column to the question.

When the caution screen 40 is displayed, a preview image indicating an area to be printed may also be displayed. Information (also referred to as a banner sheet) indicating contents of the difference, location of the difference, and a document name may be displayed and printed. The student may recognize print results in advance.

If the option 42b for the change of print form is selected and the print button 44 is operated (step S17), the controller 20 transmits to the image processing apparatus 3 the substitute document in the print form having a lower billing amount and the document and provides the print instruction (step S14). If the print form before change is color printing, the print form with a lower billing amount may be a print form of monochrome printing. If the print form before change is duplex printing, the print form with a lower billing amount may be simplex printing or N-up printing.

The displaying of the option 42b for the change of print form is not limited to when the print point number of the teacher is not enough. If the print form set at the printing of the original document is different from the print form set for the substitute document to be printed at the moment, the print form set for the original document may be displayed. If the print form of the original document is different from the print form of the substitute document to be printed at the moment, paper documents printed and output may be different and substitution of paper documents may be difficult. The print form set for the original document may be displayed for reference such that a student going to print may change the print form for the substitute document.

If the cancel printing button 45 is operated in step S17 (no path), the process in the flowchart ends.

First Modification

If a student having provided an instruction to print the substitute document has printed a document as a print target, the controller 20 in the server 2 cause a difference between the document as the print target and the substitute document to be printed or causes the difference and a region before the difference or a region after the difference to be printed. If the student having provided the instruction to print the substitute document has not printed the document as the print target, the controller 20 in the server 2 causes the whole of the substitute document to be printed. In such a case, in response to an instruction from the student, the controller 20 may cause the difference to be printed or cause the difference and the region before the difference or the region after the difference to be printed.

Second Modification

If the student having provided the instruction to print the substitute document has printed the document as the print target, the controller 20 in the server 2 may subtract the print point number responsive to the printing of the substitute document from the print point number managed in accordance with the objective of the document. The print point number managed in accordance with the objective of the document may be the print point number managed in accordance with the budget of classes and budget of university.

Third Modification

Part or whole of the functions of the server 2 may be implemented by the image processing apparatus 3. According to the exemplary embodiment, the server 2 stores the print point information table 213, and the controller 20 in the server 2 performs the print point process. Alternatively, the image processing apparatus 3 may store the print point information table 213 and the controller 30 in the image processing apparatus 3 may perform the print point process.

Part or whole of the processor may be implemented by a hardware circuit, such as Field Programmable Gate Array (FPGA) or Application Specific Integrated Circuit (ASIC).

In the embodiments above, the term "processor" refers to hardware in a broad sense. Examples of the processor include general processors (e.g., CPU: Central Processing Unit) and dedicated processors (e.g., GPU: Graphics Processing Unit, ASIC, FPGA, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The elements of the exemplary embodiment may be partially omitted or modified. In the flow of the process of the exemplary embodiment, steps may be added, deleted, modified, or interchanged. The program in the exemplary embodiment may be supplied in a recorded form on a computer readable recording medium, such as compact disc read-only memory (CD-ROM). The program may be stored on an external server, such as a cloud server, and may be available via a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
   in accordance with log information on printing performed on a document by a printer, subtract a number of billing units responsive to printing of the document from a number of billing units held by the printer; and
   if the printer having printed a document as a print target produced by a producer and corresponding to a substitute document prints the substitute document in accordance with the log information and correspondence information indicating a correspondence relation between the document as the print target and the substitute document substituting for the document, not subtract a number of billing units responsive to printing of the substitute document from the number of billing units held by the printer.

2. The information processing apparatus according to claim 1, wherein the processor is configured to, if the printer having printed the substitute document has printed the document as the print target, subtract the number of billing units responsive to the printing of the substitute document from a number of billing units held by an instructor having provided an instruction to substitute for the document.

3. The information processing apparatus according to claim 2, wherein the processor is configured to, if the instruction to substitute for the document provided by the instructor is based an instruction of the producer, subtract the number of billing units responsive to the printing of the substitute document from a number of billing units held by the producer.

4. The information processing apparatus according to claim 2, wherein the processor is configured to, if a number of billing units held by the instructor or the producer fails to reach the number of billing units responsive to the printing of the substitute document when an instruction to print the substitute document is provided, cause printing to be performed by changing a print form of the substitute document into a print form having a lower amount of billing.

5. The information processing apparatus according to claim 3, wherein the processor is configured to, if a number of billing units held by the instructor or the producer fails to reach the number of billing units responsive to the printing of the substitute document when an instruction to print the substitute document is provided, cause printing to be performed by changing a print form of the substitute document into a print form having a lower amount of billing.

6. The information processing apparatus according to claim 2, wherein the processor is configured to, if a number of billing units held by the instructor or the producer fails to reach the number of billing units responsive to the printing of the substitute document when a instruction to print the substitute document is provided, cause a difference between the document as the print target and the substitute document to be printed or cause the difference and a region before the difference or a region after the difference to be printed.

7. The information processing apparatus according to claim 3, wherein the processor is configured to, if a number of billing units held by the instructor or the producer fails to reach the number of billing units responsive to the printing of the substitute document when a instruction to print the substitute document is provided, cause a difference between the document as the print target and the substitute document to be printed or cause the difference and a region before the difference or a region after the difference to be printed.

8. The information processing apparatus according to claim 6, wherein the processor is configured to, if the difference is to be printed or the difference and the region before the difference or the region after the difference is to be printed, display an area to be printed and if a permission to print is obtained, cause the area to be printed.

9. The information processing apparatus according to claim 7, wherein the processor is configured to, if the difference is to be printed or the difference and the region before the difference or the region after the difference is to be printed, display an area to be printed and if a permission to print is obtained, cause the area to be printed.

10. The information processing apparatus according to claim 1, wherein the processor is configured to, if the printer having provided an instruction to print the substitute document has printed the document as the print target, cause a difference between the document as the print target and the substitute document to be printed or cause the difference and a region before the difference or a region after the difference to be printed, and if the printer having provided the instruction to print the substitute document has not printed the document as the print target, cause the substitute document to be printed.

11. The information processing apparatus according to claim 2, wherein the processor is configured to, if the printer having provided an instruction to print the substitute document has printed the document as the print target, cause a difference between the document as the print target and the substitute document to be printed or cause the difference and a region before the difference or a region after the difference to be printed, and if the printer having provided the instruction to print the substitute document has not printed the document as the print target, cause the substitute document to be printed.

12. The information processing apparatus according to claim 3, wherein the processor is configured to, if the printer having provided an instruction to print the substitute document has printed the document as the print target, cause a difference between the document as the print target and the substitute document to be printed or cause the difference and a region before the difference or a region after the difference to be printed, and if the printer having provided the instruction to print the substitute document has not printed the document as the print target, cause the substitute document to be printed.

13. The information processing apparatus according to claim 10, wherein the processor is configured to, if the printer has provided an instruction, cause the difference to be printed or cause the difference and the region before the difference or the region after the difference to be printed.

14. The information processing apparatus according to claim 11, wherein the processor is configured to, if the printer has provided an instruction, cause the difference to be printed or cause the difference and the region before the difference or the region after the difference to be printed.

15. The information processing apparatus according to claim 12, wherein the processor is configured to, if the printer has provided an instruction, cause the difference to be printed or cause the difference and the region before the difference or the region after the difference to be printed.

16. The information processing apparatus according to claim 1, wherein the processor is configured to, if the printer having provided an instruction to print the substitute document has printed the document as the print target, display a print form of the document as the print target, receive a print form of the substitute document in a form-modifiable manner, and cause the substitute document to be printed in a specified form.

17. The information processing apparatus according to claim 1, wherein the processor is configured to, if the printer having printed the substitute document has printed the document as the print target, subtract the number of billing units responsive to the printing of the substitute document from a number of billing units managed and related to an objective of the document.

18. An information processing method comprising:
in accordance with log information on printing performed on a document by a printer, subtracting a number of billing units responsive to printing of the document from a number of billing units held by the printer; and if the printer having printed a document as a print target corresponding to a substitute document prints the substitute document in accordance with the log information and correspondence information indicating a correspondence relation between the document as the print target produced by a producer and the substitute document substituting for the document, not subtracting a number of billing units responsive to printing of the substitute document from the number of billing units held by the printer.

19. A non-transitory computer readable medium storing a program causing a computer to execute a process, the process comprising:

in accordance with log information on printing performed on a document by a printer, subtracting a number of billing units responsive to printing of the document from a number of billing units held by the printer; and if the printer having printed a document as a print target produced by a producer and corresponding to a substitute document prints the substitute document in accordance with the log information and correspondence information indicating a correspondence relation between the document as the print target and the substitute document substituting for the document, not subtracting a number of billing units responsive to printing of the substitute document from the number of billing units held by the printer.

* * * * *